United States Patent
Naruoka et al.

(10) Patent No.: US 6,893,776 B2
(45) Date of Patent: May 17, 2005

(54) POSITIVE ACTIVE MATERIAL FOR NON-AQUEOUS ELECTROLYTE SECONDARY BATTERY AND NON-AQUEOUS ELECTROLYTE SECONDARY BATTERY COMPRISING SAME

(75) Inventors: Yoshinori Naruoka, Kyoto (JP); Junichi Toriyama, Kyoto (JP); Masanao Terasaki, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 459 days.

(21) Appl. No.: 09/986,431

(22) Filed: Nov. 8, 2001

(65) Prior Publication Data

US 2002/0086210 A1 Jul. 4, 2002

(30) Foreign Application Priority Data

Nov. 14, 2000 (JP) .................................... P.2000-346973

(51) Int. Cl.⁷ ............................................... H01M 4/58
(52) U.S. Cl. ............................... 429/231.3; 429/231.1; 429/223; 429/224; 429/231.4; 429/231.8; 252/521.2
(58) Field of Search ........................ 429/231.3, 231.1, 429/223, 224, 231.4, 231.8; 252/521.2

(56) References Cited

U.S. PATENT DOCUMENTS 5,707,756 A * 1/1998 Inoue et al. ................. 429/57
5,718,989 A    2/1998 Aoki et al.
5,795,558 A    8/1998 Aoki et al.

FOREIGN PATENT DOCUMENTS

| JP | 5-242891 A | 9/1993 |
| JP | 8-37007 A | 2/1996 |
| JP | 8-213015 A | 8/1996 |
| JP | 9-171824 A | 6/1997 |
| JP | 10-289731 A | 10/1998 |
| JP | 11-307094 A | 11/1999 |
| JP | 2000-133262 A | 5/2000 |

\* cited by examiner

*Primary Examiner*—Laura Weiner
(74) *Attorney, Agent, or Firm*—Sughrue Mion, PLLC

(57) ABSTRACT

A positive active material for a non-aqueous electrolyte secondary battery includes a lithium-nickel composite oxide represented by the compositional formula $Li_aNi_{1-b-c}Co_bMn_cO_2$ ($a \leq 1.09$, $0.05 \leq b \leq 0.35$, $0.15 \leq c \leq 0.35$, and $0.25 \leq b+c \leq 0.55$). By X-ray diffractometry with a CuKα ray, the lithium-nickel composite oxide exhibits an intensity ratio R (($I_{012}+I_{006})/I_{101}$) of not greater than 0.50, wherein R is the ratio of the sum of the diffraction peak intensity $I_{012}$ on the 012 plane and the diffraction peak intensity $I_{006}$ on the 006 plane to the diffraction peak intensity $I_{101}$ on the 101 plane. The crystallinity of the positive active material of the compositional formula $Li_aNi_{1-b-c}Co_bMn_cO_2$ can be kept high and it is possible to secure good capacity density and cycle life performance.

11 Claims, 7 Drawing Sheets

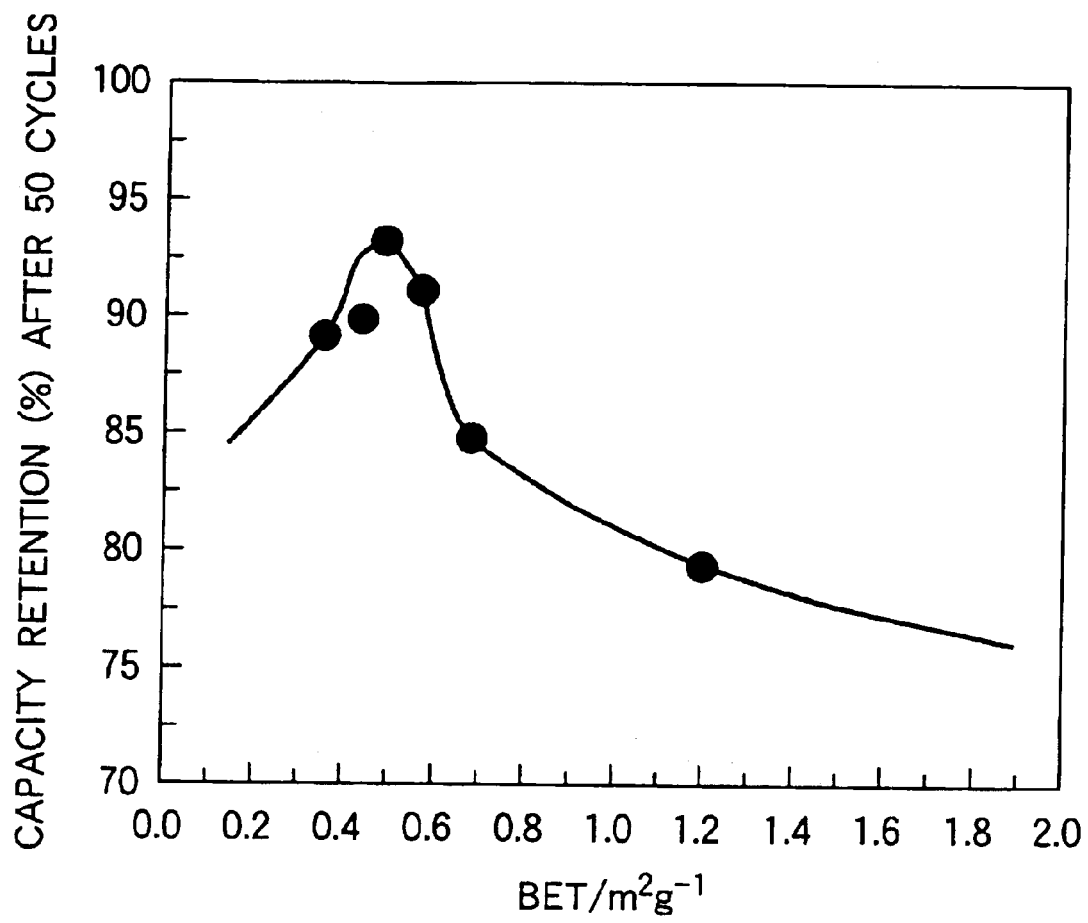

POSITIVE ACTIVE MATERIAL FOR NON-AQUEOUS ELECTROLYTE SECONDARY BATTERY AND NON-AQUEOUS ELECTROLYTE SECONDARY BATTERY COMPRISING SAME

FIELD OF THE INVENTION

The present invention relates to a positive active material for the non-aqueous electrolyte secondary battery and a non-aqueous electrolyte secondary battery comprising same.

BACKGROUND OF THE INVENTION

In recent years, reduction in the size and weight of the portable electronic apparatus is remarkable. With this tendency, there has been a growing demand for the reduction of the size and weight of the secondary battery as a power supply. In order to meet this requirement, various secondary batteries have been developed. Nowadays, a lithium ion battery comprising a positive electrode made of lamellar lithium-cobalt composite oxide as a positive active material has a high working voltage and a high energy density and thus is useful for the foregoing purpose and has been widely used. Lithium-cobalt composite oxide occurs scarcely and thus is expensive. Therefore, as a positive active material substituting for lithium-cobalt composite oxide, there has been proposed lithium-manganese composite oxide or lithium-nickel composite oxide.

However, lithium-manganese composite oxide is disadvantageous in that it has a low theoretical capacity density and shows a great capacity drop with charge and discharge cycles. Further, lithium-nickel composite oxide has the highest theoretical capacity density but is disadvantageous in that it exhibits deteriorated cycle life performance and thermal stability. A lithium-nickel composite oxide comprising lithium in a molar ratio which is not completely stoichiometrical can easily have an incomplete hexagonal structure having the Ni element incorporated in Li layer sites and thus easily cause deterioration of the cycle life performance.

In the case of large-sized battery, when a large current flows due to shortcircuiting, misuse, etc., the battery temperature suddenly rises, making it likely that a combustible liquid electrolyte or its decomposition gas can flow out and further can be ignited. In particular, when a lithium-nickel composite oxide is used as a positive active material, it releases oxygen at high temperatures while being charged because of the deteriorated thermal stability. Thus, there is a fear of causing a sudden reaction of the electrode with the liquid electrolyte that leads to thermal runaway and ignition/rupture of the battery.

The method for evaluating the safety of these batteries include the nail penetrating test defined in "Guideline for Criterion on Evaluation of Safety of Lithium Secondary Battery (SBA G101)" published by *Nihon Chikudenchi Kogyokai* (Japan Society of Storage Battery Industry). In accordance with this method, a nail having a diameter of from 2.5 mm to 5 mm is allowed to pierce through a fully charged battery at a substantially central portion at room temperature perpendicularly to the plane of the electrode. The battery is then allowed to stand for 6 hours or longer. This test is designed on the supposition that the battery can encounter misuse such as accidental penetration of a nail or the like during the packaging (e.g., in a wood box). When a nail pierces through the battery, the positive electrode and the negative electrode come in direct contact with each other in the battery to cause internal shortcircuiting. Accordingly, this method is also used to evaluate the possibility of ignition or rupture due to heat generation by sudden reaction in the battery.

In the foregoing nail penetrating test, it has been confirmed that the existing lithium secondary battery can undergo rupture/ignition. Therefore, it has been desired to develop a technique for enhancing the thermal stability of the battery without impairing the high performance thereof.

In order to provide the battery with high resistance to internal shortcircuiting or high safety, various mechanisms have heretofore been proposed. For example, a technique has been proposed which is designed to fuse a separator made of a porous membrane to close its pores and hence cause shutdown. Another technique involves the attachment of a PTC element which raises its resistivity with the temperature rise to the exterior of the battery. In this arrangement, when any abnormality occurs, flowing current gradually decreases.

However, it is essentially necessary that the safety of the secondary battery should be enhanced to prevent the occurrence of dangerous conditions even upon unforeseen accident. At present, it is difficult to say that the safety of the battery can be sufficiently established. In particular, a large-sized secondary battery having a capacity of 3 Ah or higher has an increased chemical energy stored in the battery. Thus, it is more important for this secondary battery to have a sufficient safety.

Under these circumstances, an object of the present invention is to provide a lithium-nickel composite oxide having a high capacity density and improved charge and discharge cycle life performance and thermal stability and provide a non-aqueous electrolyte secondary battery having a higher safety comprising such a lithium-nickel composite oxide as a positive active material.

SUMMARY OF THE INVENTION

It has been found that these problems can be solved by arranging the composition, crystallinity, mean particle diameter and BET surface area of lithium-nickel composite oxide within respective predetermined ranges to provide a positive active material having a high capacity density, and the excellent cycle life performance and thermal stability.

In other words, the present invention relates to a positive active material for the non-aqueous electrolyte secondary battery comprising a lithium-nickel composite oxide represented by the compositional formula $Li_a Ni_{1-b-c} Co_b Mn_c O_2$ (in which the suffix a is not greater than 1.09 (a≦1.09), the suffix b is from not smaller than 0.05 to not greater than 0.35 (0.05≦b≦0.35), and the suffix c is from not smaller than 0.15 to not greater than 0.35 (0.15≦c≦0.35), with the proviso that the sum of b and c is from not smaller than 0.25 to not greater than 0.55 (0.25≦b+c≦0.55)) having a hexagonal structure. When subjected to the X-ray diffractometry with the CuKα ray, the lithium-nickel composite oxide exhibits an intensity ratio R [=$(I_{012}+I_{006})/I_{101}$] of not greater 0.50, wherein R is the ratio of the sum of the diffraction peak intensity $I_{102}$ on the 012 plane and the diffraction peak intensity $I_{006}$ on 006 plane to the diffraction peak intensity $I_{101}$ on the 101 plane.

In this arrangement, the crystallinity of the positive active material represented by the compositional formula $Li_a Ni_{1-b-c} Co_b Mn_c O_2$ can be kept high. At the same time, the adhesivity of the positive active material to the electrically conductive material and the binder in the positive electrode material can be kept to inhibit the rise of internal resistance, making it possible to secure the good capacity density and cycle life performance.

In other words, by predetermining the compositional ratio a of Li to a range of not greater than 1.09, the proportion of the Li element in the Li layer site in the hexagonal structure can be increased to obtain a positive active material having a high crystallinity. When the compositional ratio "a" exceeds 1.09, Li layer site is filled with Li element, but Li element may exist also in other sites, lowering the crystallinity of the positive active material.

By replacing some of the Ni element by the Co element and the Mn element, the resulting positive active material can be provided with an enhanced thermal stability. By predetermining the compositional ratio b and c to the range of from not smaller than 0.05 to not greater than 0.35 and from not smaller than 0.15 to not greater than 0.35, with the proviso that the sum of b and c is from not smaller than 0.25 to not greater than 0.55, the resulting positive active material can be provided with an excellent thermal stability without lowering the capacity density thereof.

Referring to the crystallinity of the lithium-nickel composite oxide, the data of the diffraction peak intensity on various crystalline planes obtained by X-ray diffractometry is used as an important parameter from which the crystallinity of lithium-nickel composite oxide can be presumed. In other words, the intensity ratio R $[=(I_{012}+I_{006})/I_{101}]$ of the sum of the diffraction peak intensity $I_{012}$ on the 012 plane and the diffraction peak intensity $I_{006}$ on the 006 plane to the diffraction peak intensity $I_{101}$ on the 101 plane observed when the lithium-nickel composite oxide is subjected to the X-ray diffractometry with the CuKα ray can be used as a parameter from which the crystallinity thereof can be presumed. It is considered that the smaller this intensity ratio is, the higher is the crystallinity of lithium-nickel composite oxide. In the present invention, it was found that, when R is not greater than 0.50, the resulting lithium-nickel composite oxide has a high crystallinity and thus gives an excellent cycle life performance.

The positive active material preferably has a mean particle diameter $D_{50}$ of from 4 μm to 25 μm and a BET specific surface area of from 0.2 to 1.5 m$^2$/g.

The mean particle diameter $D_{50}$ of the lithium-nickel composite oxide indicates the particle diameter corresponding to the volume of 50% on the volume distribution of particles measured by the laser diffraction scattering method. By using a lithium-nickel composite oxide having a mean particle diameter $D_{50}$ of from 4 μm to 25 μm as a positive active material, the capacity density can be kept high. When the mean particle diameter $D_{50}$ of the lithium-nickel composite oxide falls below 4 μm, a part of the composite oxide powder may not come in contact with the electrically conductive material. On the contrary, when the mean particle diameter $D_{50}$ of the lithium-nickel composite oxide exceeds 25 μm, the electrolyte may not penetrate deep into the composite oxide powder, presumably producing portions which cannot make sufficient contribution to charge and discharge reaction.

By using a lithium-nickel composite oxide having a BET specific surface area of from 0.2 to 1.5 m$^2$/g as determined by the N$_2$ gas absorption method as a positive active material, the capacity density can be kept high. When BET specific surface area falls below 0.2 m$^2$/g, the reaction area on the electrode in contact with the liquid electrolyte is reduced, raising the reaction resistance. On the contrary, when BET specific surface area exceeds 1.5 m$^2$/g, the repetition of charge and discharge causes expansion/shrinkage that reduces the adhesivity of the positive active material to the binder, raising the internal resistance and hence making it impossible to obtain a sufficient capacity density.

Further, the composition of the positive active material is preferably arranged such that the suffixes b and c are from not smaller than 0.05 to not greater than 0.25 and from not smaller than 0.2 to not greater than 0.35, respectively. By controlling b and c to the above defined range, the amount of Mn to be replaced in the lithium-nickel composite oxide as the positive active material can be controlled further more preferably, making it possible to obtain a positive active material having a high thermal stability without lowering the capacity density too much.

The present invention also relates to a positive active material for the non-aqueous electrolyte secondary battery comprising a lithium-nickel composite oxide represented by the compositional formula $Li_aNi_{1-b-c-d}Co_bMn_cM_dO_2$ (in which M is at least one metal element selected from the group consisting of Al, Ti, W, Nb and Mo, the suffix a is not greater than 1.09(a≦1.09), the suffix b is from not smaller than 0.05 to not greater than 0.35 (0.05≦b≦0.35), the suffix c is from not smaller than 0.15 to not greater than 0.35 (0.15≦c≦0.35), and the suffix d is from greater than 0 to not greater than 0.35 (0≦d≦0.35), with the proviso that the sum of b, c and d is from not smaller than 0.25 to not greater than 0.55 (0.25≦b+c+d≦0.55)) having a hexagonal structure. When subjected to the X-ray diffractometry with the CuKα ray, the lithium-nickel composite oxide exhibits an intensity ratio R $(=(I_{012}+I_{006})/I_{101})$ of not greater 0.50, R being the ratio of the sum of the diffraction peak intensity $I_{012}$ on the 012 plane and the diffraction peak intensity $I_{006}$ on the 006 plane to the diffraction peak intensity $I_{101}$ on the 101 plane.

By this constitution, the crystallinity of the positive active material represented by the compositional formula $Li_aNi_{1-b-c-d}Co_bMn_cM_dO_2$ an be kept high. At the same time, the adhesivity of the positive active material to the electrically conductive material and the binder in the positive electrode compound can be kept to inhibit the increase of internal resistance, making it possible to secure the excellent capacity density and cycle life performance.

In this case, too, the positive active material preferably has a mean particle diameter $D_{50}$ of from 4 μm to 25 μm and a BET specific surface area of from 0.2 to 1.5 m$^2$/g.

By using a lithium-nickel composite oxide having a mean particle diameter $D_{50}$ of from 4 μm to 25 μm as a positive active material, the capacity density can be kept high. When the mean particle diameter $D_{50}$ of the lithium-nickel composite oxide falls below 4 μm, a part of the composite oxide powder may not come in contact with the electrically conductive material. On the contrary, when the mean particle diameter $D_{50}$ of the lithium-nickel composite oxide exceeds 25 μm, the liquid electrolyte may not penetrate deep into the composite oxide powder, presumably producing portions which cannot make sufficient contribution to charge and discharge reaction.

By using a lithium-nickel composite oxide having a BET specific surface area of from 0.2 to 1.5 m$^2$/g as determined by the N$_2$ gas absorption method as a positive active material, the capacity density can be kept high. When the BET specific surface area falls below 0.2 m$^2$/g, the reaction area on the electrode in contact with the liquid electrolyte is reduced, raising the reaction resistance. On the contrary, when BET specific surface area exceeds 1.5 m$^2$/g, the repetition of charge and discharge causes expansion/ shrinkage that reduces the adhesivity of the positive active material to the binder, raising the internal resistance and hence making it impossible to obtain sufficient capacity density.

By satisfying all the composition, the crystallinity and powder properties of lithium-nickel composite oxide in the predetermined requirements, a lithium-nickel composite oxide having a high capacity density and improved cycle life performance and thermal stability can be obtained as a positive active material.

A non-aqueous electrolyte secondary battery comprising a positive electrode containing the foregoing positive active material, a negative electrode containing a carbon-based material and a non-aqueous electrolyte exhibits an improved cycle life performance and a drastically enhanced safety. Even when the foregoing positive active material comprises other active materials incorporated therein, the effect of the foregoing positive active material can be exerted as a matter of course, making it possible to obtain a non-aqueous electrolyte secondary battery having the same excellent performance as mentioned above.

BRIEF DESCRIPTION OF THE DRAWINGS

FIG. 4 is a graph illustrating the relationship between the BET surface area of a positive active material and the capacity retention of the positive active material after 50 cycles of charge and discharge.

DETAILED DESCRIPTION OF THE INVENTION

One embodiment of the present invention will be described in connection with the attached drawings.

The positive active material for the non-aqueous electrolyte secondary battery of the present invention can be obtained by, for example, the method described in the following Examples.

As the positive active material for the non-aqueous electrolyte secondary battery of the present invention, there is used a lithium-nickel composite oxide having a hexagonal structure, which is represented by the compositional formula $Li_aNi_{1-b-c}Co_bMn_cO_2$ or $Li_aNi_{1-b-c-d}Co_bMn_cM_dO_2$ (in which M is at least one metal element selected from the group consisting of Al, Ti, W, Nb and Mo), wherein the compositional ratio of elements and the physical properties of the positive active material are specified. The resulting non-aqueous electrolyte secondary battery exhibits almost the same capacity density as that of lithium-cobalt composite oxide, i.e., not smaller than 150 mAh/g, an excellent cycle life performance and a drastically enhanced the safety of the battery. As compared with the lithium-cobalt composite oxide, the foregoing positive active material has a small cobalt content, making it possible to provide a non-aqueous electrolyte secondary battery at a low cost.

The non-aqueous electrolyte secondary battery of the invention comprises, as a positive active material, a lithium-nickel composite oxide having a hexagonal structure represented by the compositional formula $Li_aNi_{1-b-c}Co_bMn_cO_2$ or $Li_aNi_{1-b-c-d}Co_bMn_cM_dO_2$ (in which M is at least one metal element selected from the group consisting of Al, Ti, W, Nb and Mo), and the foregoing lithium-nickel composite oxide may be used in admixture with other positive active materials.

Figure 1:
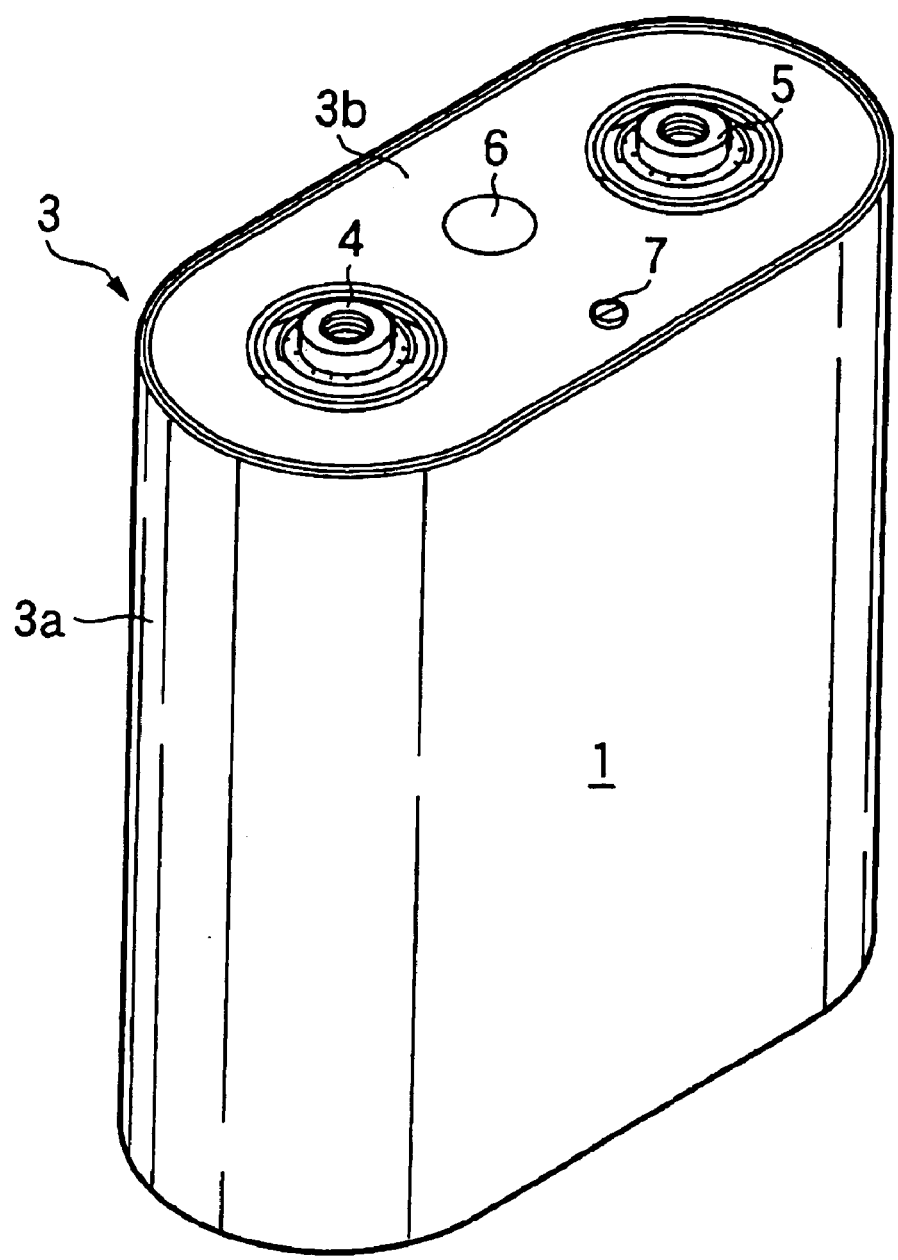
FIG. 1 is a perspective view illustrating an embodiment of the cylindrical lead acid battery according to the invention.
Figure 2:
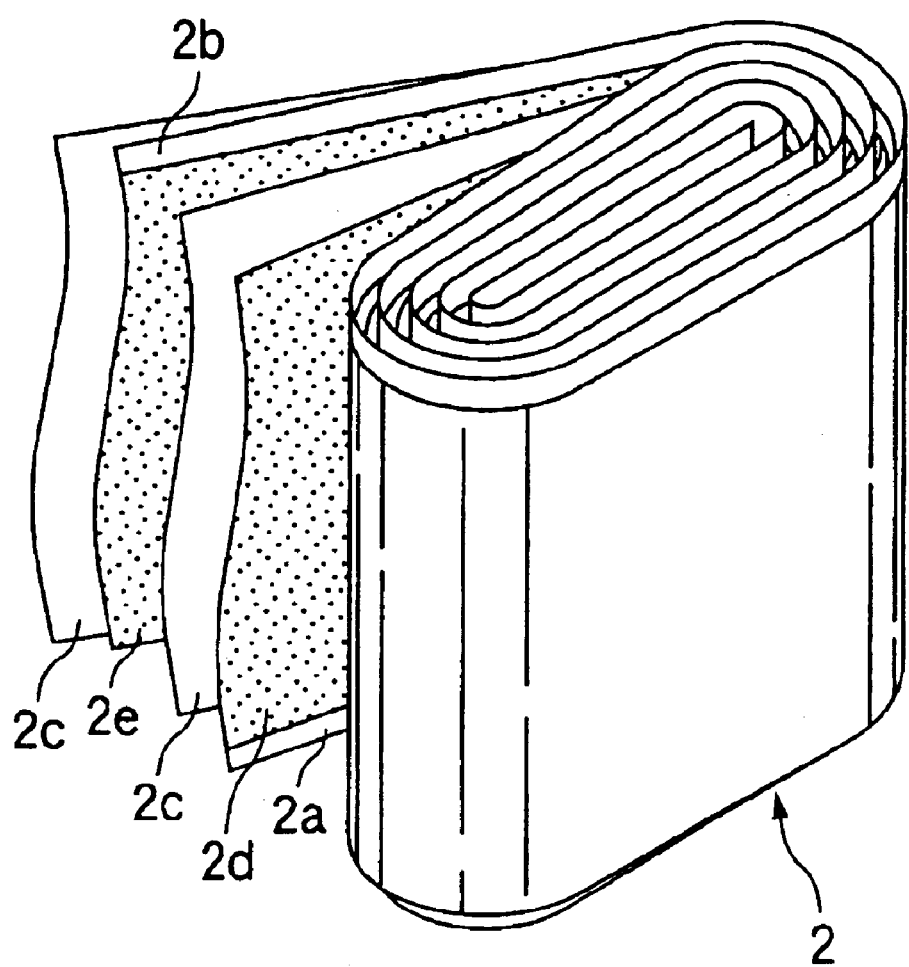
FIG. 2 is a perspective view illustrating the electricity-generating element of the cylindrical lead acid battery of FIG. 1.

The non-aqueous electrolyte secondary battery 1 according to the present embodiment comprises a flat electrode block 2 and a non-aqueous electrolyte containing an electrolyte salt received in a battery case 3a, wherein the flat electrode block 2 comprises a positive electrode 2a having an aluminum current collector coated with a positive electrode compound and a negative electrode 2b having a copper current collector coated with a negative electrode compound wound with a separator 2c interposed therebetween, as shown in FIGS. 1 and 2.

A case cover 3a provided with a safety valve 6 is laser-welded to the battery case 3a. A positive electrode terminal 4 is connected to the positive electrode 2a via a positive electrode lead wire. A negative electrode terminal 5 is electrically connected to the negative electrode 2b by causing the negative electrode 2b to contact the inner wall of the battery case 3a.

The negative electrode, separator 2c, electrolyte, etc. to be used in the non-aqueous electrolyte secondary battery 1 are not specifically limited. Materials known as these components may be used.

The negative electrode material to be used herein is not specifically limited. For example, known carbon-based materials such as coke, glass-like carbon, graphite, hardly graphitizable carbon, pyrolytic carbon and carbon fiber, or metallic lithium, lithium alloy, polyacene, etc. may be used singly or in admixture or two or more. Alternatively, a transition metal may be used in the form of oxide or nitrite.

As the separator to be incorporated in the non-aqueous electrolyte secondary battery of the invention, there may be used a microporous membrane made of polyolefin resin such as polyethylene. A laminate of a plurality of microporous membranes made of different materials having different weight-mean molecular weights and porosities may be used. Alternatively, these microporous membranes may comprise various additives such as a plasticizer, an antioxidant and a fire retardant incorporated therein in a proper amount.

The organic solvent for the liquid electrolyte to be used in the non-aqueous electrolyte secondary battery of the invention is not specifically limited. Examples of the organic solvents employable herein include ethers, ketones, lactones, nitrites, amines, amides, sulfur compounds, halogenated hydrocarbons, esters, carbonates, nitro compounds, phosphate compounds, and sulfolan-based hydrocarbons. Preferred among these organic solvents are ethers, ketones, esters, lactones, halogenated hydrocarbons, carbonates, and sulfolan-based compounds. Specific examples of these organic solvents include tetrahydrofuran, 2-methyltetrahydrofuran, 1,4-dioxane, anisole, monoglyme, 4-methyl-2-pentanone, ethyl acetate, methyl acetate, methyl propionate, ethyl propionate, 1,2-dichloroethane, γ-butyrolactone, dimethoxyethane, methyl formate, dimethyl carbonate, methyl ethyl carbonate, diethyl carbonate, propylene carbonate, ethylene carbonate, vinylene carbonate, dimethylformamide, dimethyl sulfoxide, dimethylthioformamide, sulfolan, 3-methyl-sulfolan, trimethyl phosphate, triethyl phosphate, and mixture thereof.

However, the present invention is not limited to these compounds. Preferred among these compounds are cyclic carbonates and cyclic esters. Even more desirable among these compounds are ethylene carbonate, propylene carbonate, methyl ethyl carbonate, and diethyl carbonate. These compounds may be used singly or in combination of two or more thereof.

The electrolyte salt to be used in the non-aqueous electrolyte secondary battery of the invention is not specifically limited. In practice, however, $LiClO_4$, $LiBF_4$, $LiAsF_6$, $CF_3SO_3Li$, $LiPF_6$, $LiPF_3$ $(C_2F_5)_3$, $LiN$ $(CF_3SO_2)_2$, $LiN$ $(C_2F_5SO_2)$ 2, LiI, LiAlCl4, and mixture thereof may be used. Preferably, lithium salt such as $LiBF_4$ and $LiPF_6$ may be used singly or in admixture.

As the electrolyte for, the present invention, a solid ionically-conductive polymer electrolyte may be used auxiliary. In this case, the structure of the non-aqueous electrolyte secondary battery may be a combination of a positive electrode, a negative electrode, a separator, an organic or inorganic solid electrolyte membrane as a separator, and the foregoing non-aqueous liquid electrolyte, or a combination of a positive electrode, a negative electrode, an organic or inorganic solid electrolyte membrane as a separator, and the aforementioned non-aqueous liquid electrolyte. A polymer electrolyte membrane made of polyethylene oxide, polyacrylonitrile, polyethylene glycol or modification product thereof has a light weight and flexibility and thus can be used as an electrode to be wound to advantage. Besides the polymer electrolyte, an inorganic solid electrolyte or a mixture of an organic polymer electrolyte and an inorganic solid electrolyte may be used.

Other battery constituents include the current collector, the terminals, the insulating plate, the battery case, etc. Conventionally known materials as they are may be used as these constituents.

Taking into account the effect of the present invention to enhance the safety, the present invention is preferably applied to a large-sized, non-aqueous electrolyte secondary battery having a capacity of 3 Ah or more.

The present invention will be further described in the following examples.

(Preparation of Positive Active Material)

As the starting materials for the positive active material, a mixed carbonates represented by the compositional formula $Li_aNi_{1-b-c}Co_bMn_cCO_2$ (in which b and c vary from greater than 0 to smaller than 1 (0<b<1; 0<c<1)) and lithium hydroxide were mixed. The mixture was calcined at the temperature set forth in Table 1 in an oxygen atmosphere for 24 hours, and then ground to obtain a lithium-nickel composite oxide represented by the compositional formula $Li_aNi_{1-b-c}Co_bMn_cO_2$ set forth in Table 1. As a result of analysis by the X-ray diffraction, it was confirmed that many of these composite oxides have a hexagonal structure. The composition of these composite oxides were then quantitatively analyzed by the ICP emission spectroscopy. The results are set forth in terms of compositional formula of composite oxide in Table 1.

Subsequently, as the starting materials, lithium carbonate and cobalt tetraoxide were mixed. The mixture was calcined at a temperature of 800° C. in the atmosphere for 24 hours, and then ground to obtain a lithium-cobalt composite oxide represented by the compositional formula $LiCoO_2$ (Comparative Example 12). As a result of the powder X-ray diffractometry, it was confirmed that the lithium-cobalt composite oxide has a hexagonal structure.

All the positive active materials thus prepared exhibited a mean particle diameter $D_{50}$ of 11.0 μm and a BET surface area of 0.60 m²/g. For the determination of the mean particle diameter $D_{50}$, the distribution of volume of particles was measured by the laser diffraction scattering method. The mean particle diameter $D_{50}$ corresponding to the volume of 50% was then determined. The BET surface area was measured by the $N_2$ gas absorption method. (Preparation of positive electrode and test battery) To a positive electrode compound obtained by mixing 87% of the aforementioned positive active material, 5% by weight of acetylene black and 8% by weight of a polyvinylidene fluoride was added N-methyl-2-pyrrolidone to prepare a viscous material. A foamed aluminum having a porosity of 90% was filled with this viscous material, dried in vacuo at a temperature of 150° C. to cause N-methyl-2-pyrrolidone to evaporate thoroughly, and then pressure-molded.

The positive electrode having an electrode area of 2.25 cm² thus pressure-molded, a counter electrode and a reference electrode were put in a glass cell. The glass cell was then filled with a non-aqueous, liquid electrolyte obtained by dissolving 1 mol/L of $LiClO_4$ in a 1/1 (vol/vol) mixture of ethylene carbonate and diethyl carbonate to form a test battery.

(Measurement of Discharge Capacity of Positive Active Material)

This test battery was charged to 4.3 V (with respect to lithium metal) at a current of 1.0 mA/cm², and then discharged to 3.0 V at a current of 1.0 mA/cm². The discharge capacity at this point was then measured. The capacity density per 1 g of positive active material was then calculated. The results of evaluation are set forth in Table 1.

The test battery was charged to 4.3 V (with respect to lithium metal) at a current: of 1.0 mA/cm², and then discharged to 3.0 V at a current of 1.0 mA/cm². The discharge capacity at this point was then measured. Under these conditions, charge and discharge were then repeated. After 50 cycles of charge and discharge, the test battery was then measured for discharge capacity. The capacity retention was then calculated by dividing the discharge capacity by the initial discharge capacity.

TABLE 1

| Kind of positive active material | $Li_aNi_{1-b-c}Co_bMn_cO_2$ | | | | Diffraction peak intensity ratio | Calcining temperature | Capacity density | Discharge capacity retention |
|---|---|---|---|---|---|---|---|---|
| | a | b | c | b + c | R | (° C.) | (mAh/g) | (%) |
| Ex. 1 | 1.00 | 0.09 | 0.18 | 0.27 | 0.499 | 800 | 170 | 82 |
| Ex. 2 | 1.00 | 0.20 | 0.18 | 0.38 | 0.496 | 800 | 170 | 91 |
| Ex. 3 | 1.00 | 0.30 | 0.19 | 0.49 | 0.496 | 800 | 160 | 90 |
| Ex. 4 | 1.00 | 0.09 | 0.29 | 0.38 | 0.493 | 800 | 155 | 88 |

TABLE 1-continued

| Kind of positive active material | $Li_aNi_{1-b-c}Co_bMn_cO_2$ | | | | Diffraction peak intensity ratio R | Calcining temperature (°C.) | Capacity density (mAh/g) | Discharge capacity retention (%) |
|---|---|---|---|---|---|---|---|---|
| | a | b | c | b + c | | | | |
| Ex. 5 | 1.00 | 0.20 | 0.29 | 0.49 | 0.491 | 800 | 156 | 91 |
| Ex. 6 | 1.02 | 0.15 | 0.30 | 0.45 | 0.495 | 800 | 160 | 80 |
| Ex. 7 | 1.04 | 0.14 | 0.31 | 0.45 | 0.489 | 1,000 | 161 | 85 |
| Ex. 8 | 1.05 | 0.15 | 0.30 | 0.45 | 0.489 | 900 | 160 | 89 |
| Ex. 9 | 1.07 | 0.16 | 0.29 | 0.45 | 0.454 | 1,000 | 161 | 91 |
| Ex. 10 | 1.08 | 0.15 | 0.30 | 0.45 | 0.469 | 900 | 161 | 93 |
| Ex. 11 | 1.09 | 0.05 | 0.15 | 0.20 | 0.493 | 900 | 185 | 81 |
| Ex. 12 | 1.08 | 0.05 | 0.25 | 0.30 | 0.482 | 900 | 165 | 83 |
| Ex. 13 | 1.04 | 0.35 | 0.15 | 0.50 | 0.491 | 900 | 161 | 84 |
| Ex. 14 | 1.03 | 0.25 | 0.15 | 0.40 | 0.497 | 900 | 167 | 92 |
| Ex. 15 | 1.02 | 0.15 | 0.35 | 0.50 | 0.462 | 900 | 151 | 84 |
| Ex. 16 | 1.06 | 0.10 | 0.15 | 0.25 | 0.473 | 900 | 174 | 85 |
| Ex. 17 | 1.05 | 0.20 | 0.35 | 0.55 | 0.486 | 900 | 152 | 84 |
| Comp. Ex. 1 | 1.09 | 0.05 | 0.15 | 0.20 | 0.511 | 800 | 148 | 81 |
| Comp. Ex. 2 | 1.03 | 0.05 | 0.15 | 0.30 | 0.549 | 800 | 142 | 64 |
| Comp. Ex. 3 | 1.04 | 0.35 | 0.15 | 0.50 | 0.520 | 800 | 141 | 84 |
| Comp. Ex. 4 | 1.05 | 0.25 | 0.15 | 0.40 | 0.531 | 800 | 146 | 79 |
| Comp. Ex. 5 | 1.03 | 0.15 | 0.35 | 0.50 | 0.509 | 800 | 139 | 76 |
| Comp. Ex. 6 | 1.03 | 0.10 | 0.15 | 0.25 | 0.508 | 800 | 147 | 70 |
| Comp. Ex. 7 | 1.04 | 0.20 | 0.35 | 0.55 | 0.514 | 800 | 140 | 83 |
| Comp. Ex. 8 | 1.10 | 0.05 | 0.15 | 0.20 | 0.498 | 1,000 | 146 | 83 |
| Comp. Ex. 9 | 1.07 | 0.04 | 0.26 | 0.30 | 0.472 | 1,000 | 143 | 71 |
| Comp. Ex. 10 | 1.05 | 0.15 | 0.37 | 0.52 | 0.484 | 1,000 | 136 | 75 |
| Comp. Ex. 11 | 1.06 | 0.30 | 0.30 | 0.60 | 0.476 | 1,000 | 141 | 84 |
| Comp. Ex. 12 | 1.0 | 1.0 | 0.0 | 1.0 | 0.473 | 800 | 150 | 79 |

(X-ray Diffractometry Test and Physical Property Determination Test on Positive Active Material)

The aforementioned lithium-nickel composite oxides were each subjected to the powder X-ray diffractometry with the cuKα ray to determine the diffraction peak intensity $I_{101}$ on the 101 plane, the diffraction peak intensity $I_{012}$ on the 012 plane and the diffraction peak intensity $I_{006}$ on the 006 plane. From these measurements was then calculated the intensity R defined by $(I_{101}+I_{006})/I_{101}$.

As can be seen in Table 1, the lithium-nickel composite oxide $LiNi_{1-b-c}Co_bMn_cO_2$ giving a capacity density of not smaller than that of the conventional $LiCoO_2$ (150 mA/g) and a capacity retention as good as not smaller than 80% has a formulation such that the suffix a is not greater than 1.09, the suffix b is from not smaller than 0.05 to not greater than 0.35, the suffix c is from not smaller than 0.15 to not greater than 0.35, the sum of b and c is from not smaller than 0.25 to not greater than 0.55, and R is not greater than 0.50.

Positive active materials having the same formulation as in Example 10 but having different mean particle diameters $D_{50}$ and BET surface areas were prepared as shown in Table 2. These positive active materials were each then used to prepare positive electrodes in the same manner as mentioned above. These positive electrodes were each then used to prepare test batteries.

(Charge and Discharge Cycle Life Test on Positive Active Material)

The test batteries were each charged to 4.3 V (with respect to lithium metal) at a current of 1.0 mA/cm², and then discharged to 3.0 V at a current of 1.0 mA/cm². At this point, the test batteries were each measured for discharge capacity. Under these conditions, charge and discharge were then repeated. After 50 cycles of charge and discharge, the test battery was then measured for discharge capacity. The capacity retention was then calculated by dividing the discharge capacity by the initial discharge capacity.

Figure 3:
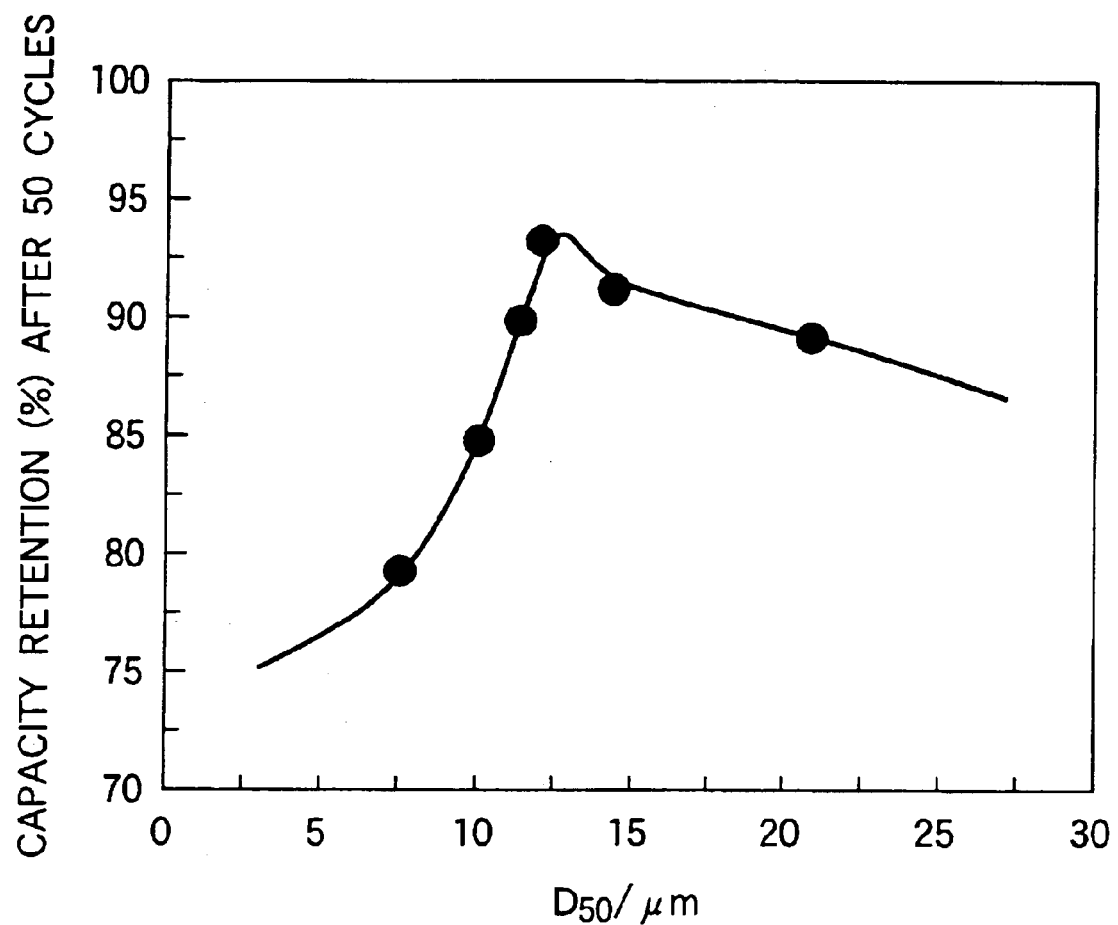
FIG. 3 is a graph illustrating the relationship between the mean particle diameter $D_{50}$ of a positive active material and the capacity retention of the positive active material after 50 cycles of charge and discharge.
Figure 5A:
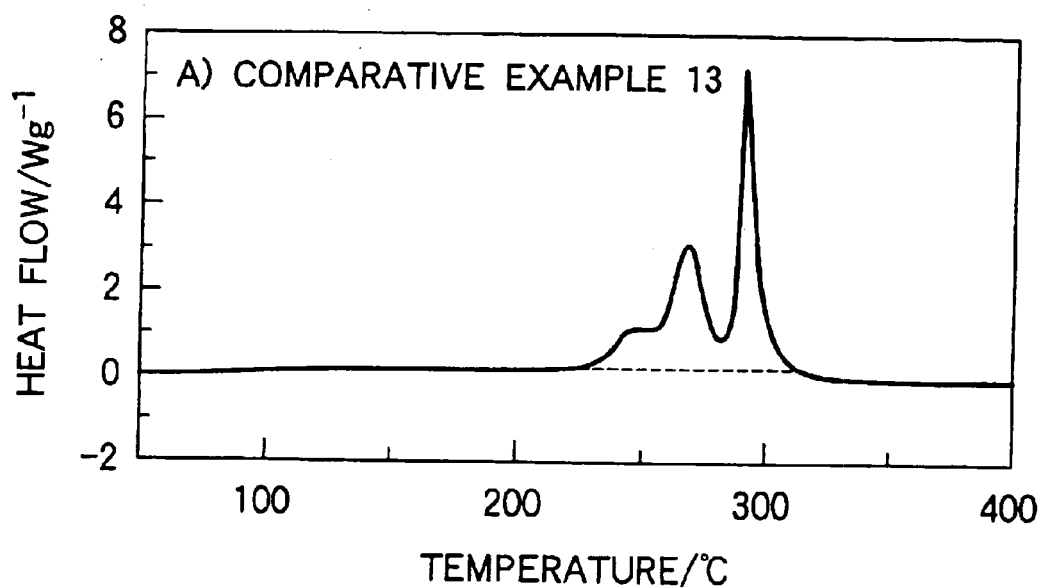
FIG. 5A to 5F are graphs illustrating the results of the measurement of heat flow of positive active material (compound) by a differential scanning calorimeter.
Figure 5B:
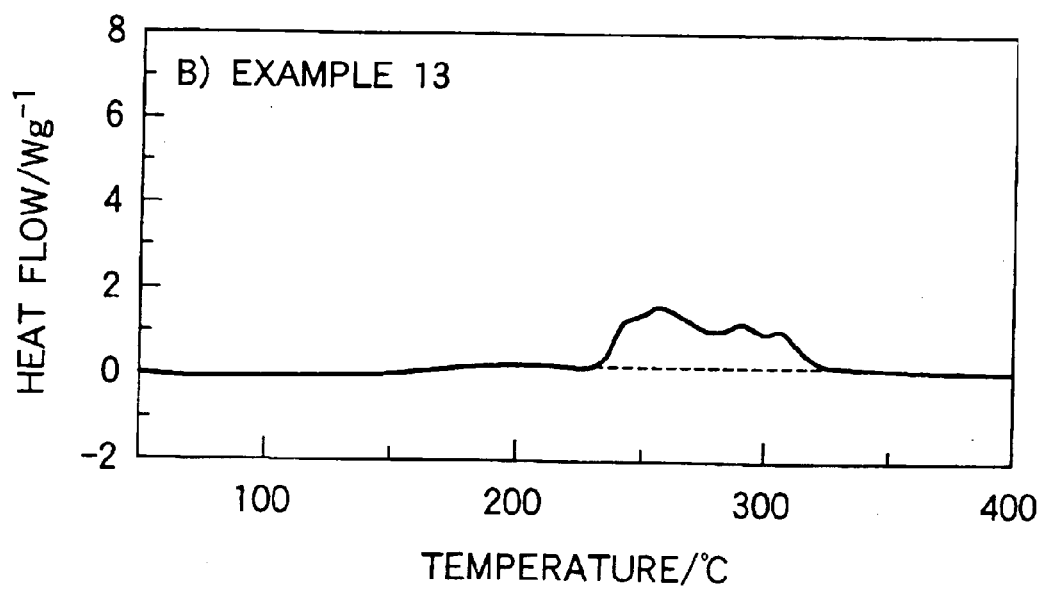
Figure 5C:
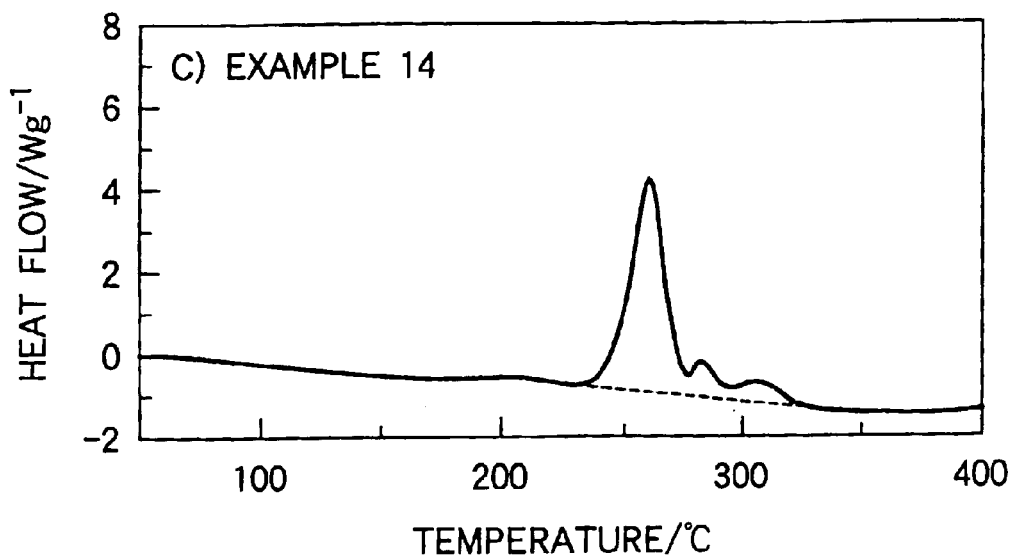
Figure 5D:
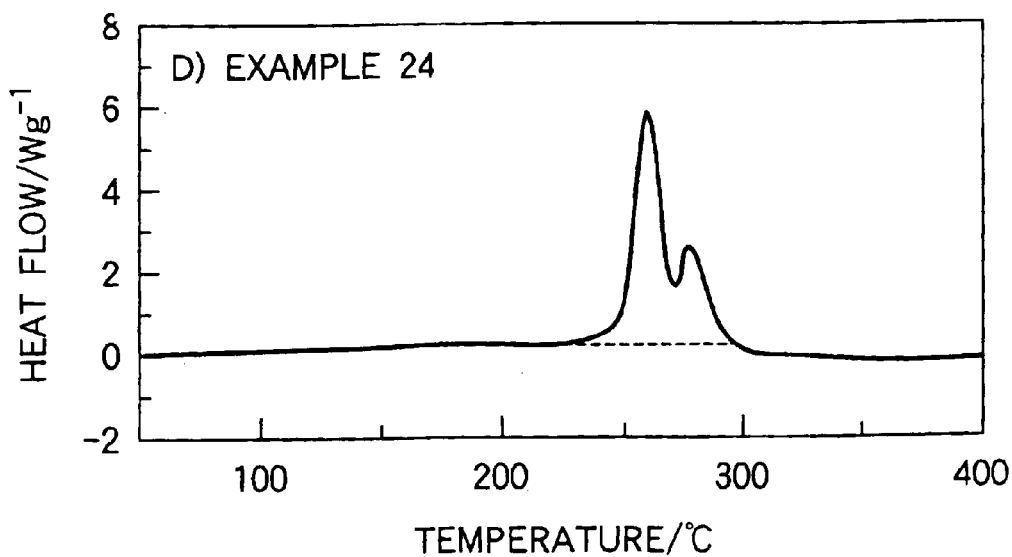
Figure 5E:
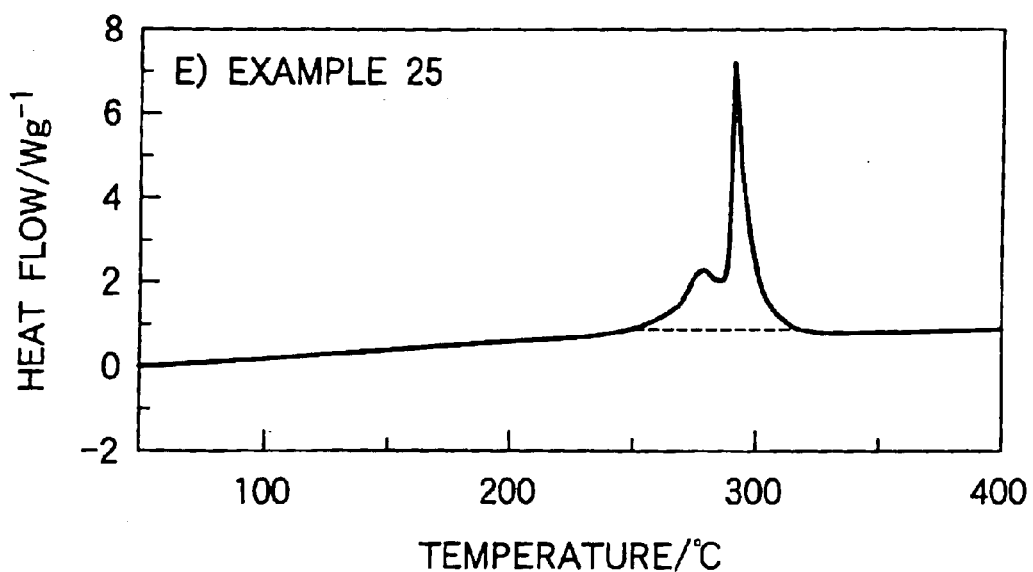
Figure 5F:
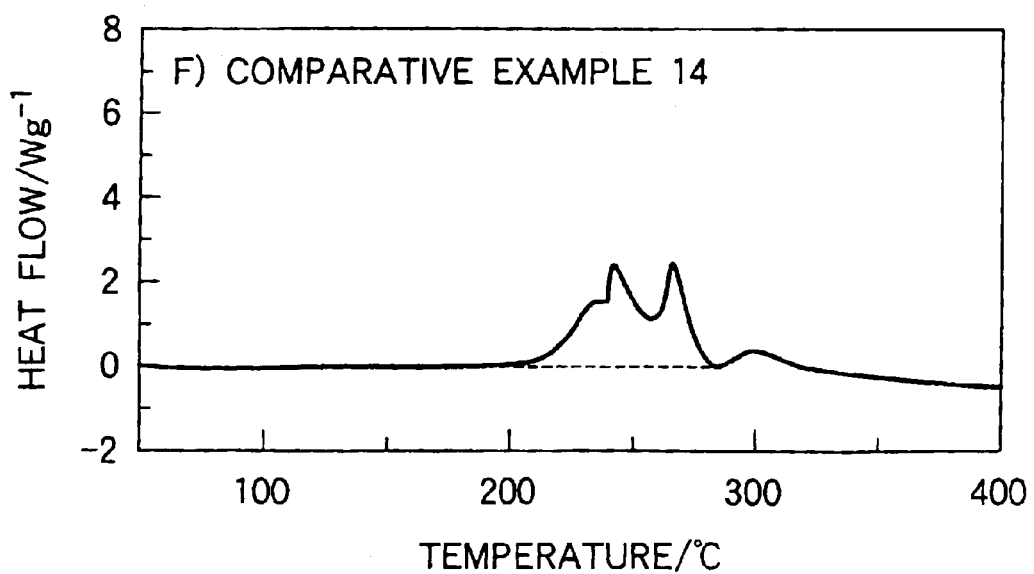

The relationship between the capacity retention and the average particle diameter $D_{50}$ and BET surface area is plotted in FIGS. 3 and 4.

TABLE 2

| Kind of positive active material | $Li_aNi_{1-b-c}Co_bMn_cO_2$ | | | | Mean particle diameter $D_{50}$ (μm) | BET surface area (m²) | Discharge capacity retention (%) |
|---|---|---|---|---|---|---|---|
| | a | b | c | b + c | | | |
| Ex. 18 | 1.08 | 0.15 | 0.30 | 0.45 | 7.6 | 1.20 | 80 |
| Ex. 19 | 1.08 | 0.15 | 0.30 | 0.45 | 10.1 | 0.69 | 85 |
| Ex. 20 | 1.08 | 0.15 | 0.30 | 0.45 | 21.0 | 0.37 | 89 |
| Ex. 21 | 1.08 | 0.15 | 0.30 | 0.45 | 11.5 | 0.45 | 90 |
| Ex. 22 | 1.08 | 0.15 | 0.30 | 0.45 | 14.5 | 0.58 | 91 |
| Ex. 23 | 1.08 | 0.15 | 0.30 | 0.45 | 12.2 | 0.50 | 93 |

As can be seen in these figures, when the mean particle diameter $D_{50}$ is from 4 μm to 25 μm and the BET surface area is from 0.2 to 1.5, the resulting positive active material exhibits, particularly, a high capacity retention and a good charge and discharge cycle life performance.

(Thermal Stability Test on Positive Active Material)

Positive active materials having the formulation set forth in Table 3 were prepared in the same manner as mentioned above.

TABLE 3

| Kind of positive active material | $Li_aNi_{1-b-c}Co_bMn_cO_2$ | | | | Diffraction peak intensity ratio R | Calcining temperature (°C.) | Exotherm starting temperature (°C.) | Dissipated heat (J/g) |
|---|---|---|---|---|---|---|---|---|
| | a | b | c | b + c | | | | |
| Comp. Ex. 13 | 1.00 | 0.35 | 0.10 | 0.45 | 0.491 | 900 | 231.2 | 662 |
| Ex. 13 | 1.04 | 0.35 | 0.15 | 0.50 | 0.491 | 900 | 232.8 | 435 |
| Ex. 14 | 1.03 | 0.25 | 0.15 | 0.40 | 0.497 | 900 | 235.0 | 603 |
| Ex. 24 | 1.00 | 0.25 | 0.20 | 0.45 | 0.462 | 900 | 236.9 | 649 |
| Ex. 25 | 1.00 | 0.15 | 0.30 | 0.45 | 0.422 | 900 | 251.2 | 405 |
| Comp. Ex. 14 | 1.00 | 1.0 | 0.0 | 1.0 | 0.473 | 900 | 210.1 | 489 |

The specimen to be tested for thermal stability was prepared as follows.

A positive electrode compound was prepared by mixing 94% by weight of each of the positive active materials set forth in Table 3, 2% by weight of acetylene black and 4% by weight of a polyvinylidene fluoride. To the positive electrode compound thus prepared was then added N-methyl-2-pyrrolidone to prepare a viscous material. The viscous material was applied to an aluminum foil, and then dried at a temperature of 150° C. in vacuo to cause N-methyl-2-pyrrolidone to evaporate thoroughly. The coated aluminum foil was roll-pressed in such a manner that the electrode area and porosity reached 3 cm$^2$ and 30%, respectively. The aluminum foil thus processed was used as a positive electrode. Lithium metal was used as counter electrode and reference electrode. As a liquid electrolyte, there was used a mixture of ethylene carbonate containing 1M LiPF$_6$ and diethyl carbonate. Thus, a test battery was prepared.

The test batteries of Comparative Example 13, Example 13, Example 14, Example 24 and Example 25 were each charged at a current of 0.5 mA/cm$^2$ until the state of Li reached Li$_{0.3}$. The test battery of Comparative Example 14 was charged at a current of 0.5 mA/cm$^2$ until the state of Li reached Li$_{0.5}$. The positive electrode compound thus charged was withdrawn from the battery, and then heated with the liquid electrolyte present therein by means of a differential scanning calorimeter (DSC). At this point, the exotherm and endotherm were measured.

The exothermic and endothermic chart of positive electrode compounds of Comparative Example 13, Example 13, Example 14, Example 24, Example 25 and Comparative Example 14 are shown in FIG. 5. The exotherm starting temperature and exotherm read from these charts are set forth in Table 3.

All the compounds comprising the positive active materials of Example 13, Example 14, Example 24 and Example 25 exhibit a higher exotherm starting temperature and a less exotherm than that of Comparative Example 13 and thus were confirmed to have an excellent thermal stability. Further, all the compounds comprising the positive active materials of Example 13, Example 14, Example 24 and Example 25 exhibit a higher exotherm starting temperature than that of Comparative Example 14 and thus was confirmed to have an excellent thermal stability.

Moreover, the compounds comprising the positive active materials of Example 13, Example 14, Example 24 and Example 25 had an increased content of manganese and thus showed an exotherm starting temperature shifted toward higher temperature and a reduced exotherm. This is presumably because the manganese element inhibited the elimination of oxygen in the crystal structures and suppressed the exotherm. Among these positive electrode compounds, those of Examples 24 and 25 exhibited a high exotherm starting temperature and a small exotherm. In particular, the positive electrode compound of Example 25 exhibited a better thermal stability than that of Comparative Example 14.

As can be seen in the aforementioned results, the positive active material of the invention exhibits an excellent thermal stability. It can be seen that the formulation of lithium-nickel composite oxide represented by the compositional formula LiNi$_{1-b-c}$Co$_b$Mn$_c$O$_2$ where the thermal stability can be judged particularly excellent can be represented by the relationships $0.05 \leq b \leq 0.25$ and $0.2 \leq c \leq 0.35$.

(Preparation of Large-sized Battery)

Subsequently, the positive active materials of Comparative Example 13, Example 24, Example 25 and Comparative Example 14 were each used to prepare a large-sized battery.

This battery was a non-aqueous electrolyte secondary battery 1 having a designed capacity of 10 Ah as shown in FIG. 1. The positive electrode 2a was prepared by mixing the aforementioned positive active material with a polyvinylidene fluoride and acetylene black, adding NMP to the mixture to prepare a paste, applying the paste to an aluminum foil, and then drying the coated aluminum to form a positive electrode compound layer thereon. The negative electrode 2b was prepared by mixing a carbon-based material (graphite) with a polyvinylidene fluoride, adding NMP to the mixture to prepare a paste, applying the paste to a copper foil, and then drying the coated copper foil to form a negative electrode compound layer thereon.

(Safety Test on Large-sized Battery (the Nail Penetrating Test))

The large-sized battery having a designed capacity of 10 Ah thus prepared was charged, and then subjected to the nail penetrating test according to the method defined in SBA G1101. The results are set forth in Table 4.

TABLE 4

| Kind of positive active material | $Li_aNi_{1-b-c}Co_bMn_cO_2$ | | | | Diffraction peak intensity ratio R | Explosion |
|---|---|---|---|---|---|---|
| | a | b | c | b + c | | |
| Comp. Ex. 13 | 1.00 | 0.35 | 0.10 | 0.45 | 0.491 | Yes |
| Ex. 24 | 1.00 | 0.25 | 0.20 | 0.45 | 0.462 | Not so much |
| Ex. 25 | 1.00 | 0.15 | 0.30 | 0.45 | 0.422 | No |
| Comp. Ex. 14 | 1.00 | 1.0 | 0.0 | 1.0 | 0.473 | No |

The large-sized battery comprising the positive active material of Comparative Example 13 exhibited an insufficient thermal stability on the positive electrode and showed ignition during the nail penetrating test. On the other hand, the large-sized batteries comprising the positive active materials of Examples 24 and 25 exhibited milder damage on the battery during the nail penetrating test as the manganese content in the positive active material rose. These test results are presumably attributed to the enhancement of the thermal stability of the positive active material.

Subsequently, $Li_{1.08}Ni_{0.53}Co_{0.14}Mn_{0.30}Al_{0.03}O_2$ was prepared as Example 26. The starting material of the positive active material was prepared by mixing $Ni_{0.55}Co_{0.15}Mn_{0.30}Co_3$ with aluminum hydroxide $Al(OH)_3$ and lithium hydroxide LiOH in an amount of 0.03 mols and 1.1 mols, respectively, per mol of $Ni_{0.55}Co_{0.15}Mn_{0.30}Co_3$, and then calcining the mixture at a temperature of 900° C. in an oxygen atmosphere for 24 hours. The positive active material was then used to prepare a positive electrode and a battery in the same manner as in Example 1. The battery thus prepared was then measured for the diffraction peak intensity ratio, capacity density, discharge capacity retention, exotherm starting temperature and exotherm. As a result, the diffraction peak intensity ratio R was 0.458, the capacity density was 158 mAh/g, the discharge capacity retention was 91%, the exotherm starting temperature was 253.0° C., and the exotherm was 357 J/g.

Accordingly, a positive active material having a high capacity density and the excellent charge and discharge cycle life performance and thermal stability can be obtained in this case as well.

As can be seen in the aforementioned description, the lithium-nickel composite oxide of the invention exhibits a high capacity density and excellent charge and discharge cycle life performance and thermal stability. Accordingly, the use of the lithium-nickel composite oxide of the invention as a positive active material makes it possible to provide a non-aqueous electrolyte secondary battery having a high energy density, a prolonged life and an excellent safety. In particular, the lithium-nickel composite oxide of the invention makes a great contribution to the enhancement of safety and thus is extremely useful as a positive active material for a large-sized non-aqueous electrolyte secondary battery. Further, the lithium-nickel composite oxide of the invention has a less content of cobalt, which is expensive, than lithium-cobalt composite oxides which are widely used at present and thus can lead to the cost reduction and has an extremely high commercial value.

While the invention has been described in detail and with reference to specific embodiments thereof, it will be apparent to one skilled in the art that various changes and modifications can be made therein without departing from the spirit and scope thereof.

This application is based on Japanese patent application No. 2000-346973 filed Nov. 14, 2000, the entire contents thereof being hereby incorporated by reference.

What is claimed is:

1. A positive active material for a non-aqueous electrolyte secondary battery, comprising a lithium-nickel composite oxide represented by the compositional formula $Li_aNi_{1-b-c}Co_bMn_cO_2$ (in which the suffix a is not greater than 1.09, the suffix b is from not smaller than 0.05 to not greater than 0.25, and the suffix c is from not smaller than 0.2 to not greater than 0.35, and the sum of b and c is from not smaller than 0.25 to not greater than 0.55) having a hexagonal structure, wherein when subjected to X-ray diffractometry with a CuKα ray, said lithium-nickel composite oxide exhibits an intensity ratio R $((I_{012}+I_{006})/I_{101})$ of not greater than 0.50 and not less than 0.422, R being the ratio of the sum of the diffraction peak intensity $I_{012}$ on the 012 plane and the diffraction peak intensity $I_{006}$ on the 006 plane to the diffraction peak intensity $I_{101}$ on the 101 plane, said positive active material has a mean particle diameter $D_{50}$ of from 4 μm to 25 μm and a BET specific surface area of from 0.2 to 1.5 m²/g.

2. A non-aqueous electrolyte secondary battery comprising a positive electrode comprising said positive active material defined in claim 1, a negative electrode comprising a carbon-based material, and a non-aqueous electrolyte.

3. The positive active material for the non-aqueous electrolyte secondary battery according to claim 1, wherein said positive active material has a mean particle diameter $D_{50}$ of from 10.1 to 25 μm.

4. The positive active material for the non-aqueous electrolyte secondary battery according to claim 3, wherein said positive active material has a BET specific surface area of from 0.37 to 0.69 m²/g.

5. The positive active material for the non-aqueous electrolyte secondary battery according to claim 3, wherein said positive active material has a mean particle diameter $D_{50}$ of from 11.5 to 25 μm.

6. The positive active material for the non-aqueous electrolyte secondary battery according to claim 5, wherein said positive material has a BET specific surface area of from 0.37 to 0.58 m²/g.

7. The positive active material for the non-aqueous electrolyte secondary battery according to claim 1, wherein said positive active material has a BET specific surface area of from 0.37 to 0.69 m²/g.

8. The positive active material for the non-aqueous electrolyte secondary battery according to claim 7, wherein said positive active material has a BET specific surface area of from 0.37 to 0.58 m²/g.

9. A positive active material for a non-aqueous electrolyte secondary battery, comprising a lithium-nickel composite oxide represented by the compositional formula $Li_aNi_{1-b-c-d}Co_bMn_cM_dO_2$ (in which M is at least one metal element selected from the group consisting of Al, Ti, W, Nb and Mo, the suffix a is not greater than 1.09, the suffix b is from not smaller than 0.05 to not greater than 0.35, the suffix c is from not smaller than 0.15 to not greater than 0.35, and the suffix d is from greater than 0 to not greater than 0.35, and the sum of b, c and d is from not smaller than 0.25 to not greater than 0.55) having a hexagonal structure, wherein when subjected to X-ray diffractometry with a CuKα ray, said lithium-nickel composite oxide exhibits an intensity ratio R $((I_{012}+I_{006})/I_{101})$ of not greater than 0.50, R being the ratio of the sum of the diffraction peak intensity $I_{012}$ on the 012 plane and the diffraction peak intensity $I_{006}$ on the 006 plane to the diffraction peak intensity $I_{101}$ on the 101 plane.

10. The positive active material for the non-aqueous electrolyte secondary battery according to claim 9, wherein said positive active material has a mean particle diameter $D_{50}$ of from 4 μm to 25 μm and a BET specific surface area of from 0.2 to 1.5 m²/g.

11. A non-aqueous electrolyte secondary battery comprising a positive electrode comprising said positive active material defined in any one of claims 9 to 10, a negative electrode comprising a carbon-based material, and a non-aqueous electrolyte.

* * * * *

UNITED STATES PATENT AND TRADEMARK OFFICE
CERTIFICATE OF CORRECTION

PATENT NO. : 6,893,776 B2  
APPLICATION NO. : 09/986431  
DATED : May 17, 2005  
INVENTOR(S) : Yoshinori Naruoka It is certified that error appears in the above-identified patent and that said Letters Patent is hereby corrected as shown below:

Title page, item [57]
In the Abstract, please change the chemical formula bridging lines 3-4 from "$Li_aNi_{1-b-c}CO_bMn_cO_2$" to -- $Li_aNi_{1-b-c}Co_bMn_cO_2$ --.

Please amend the sixth full paragraph in column 2 as follows:

In other words, the present invention relates to a positive active material for the non-aqueous electrolyte secondary battery comprising a lithium-nickel composite oxide represented by the compositional formula $Li_aNi_{1-b-c}Co_bMn_cO_2$ (in which the suffix a is not greater than 1.09 (a≦1.09), the suffix b is from not smaller than 0.05 to not greater than 0.35 (0.05≦b≦0.35), and the suffix c is from not smaller than 0.15 to not greater than 0.35 (0.15≦c≦0.35), with the proviso that the sum of b and c is from not smaller than 0.25 to not greater than 0.55 (0.25≦c≦0.55)) having a hexagonal structure. When subjected to the X-ray diffractometry with the CuKα ray, the lithium-nickel composite oxide exhibits an intensity ratio R [=$(I_{012}+I_{006})/I_{101}$] of not greater <u>than</u> 0.50, wherein R is the ratio of the sum of the diffraction peak intensity ~~$I_{102}$~~ $I_{012}$ on the 012 plane and the diffraction peak intensity $I_{006}$ on 006 plane to the diffraction peak intensity $I_{101}$ on the 101 plane.

Signed and Sealed this

Twenty-fourth Day of June, 2008

JON W. DUDAS  
*Director of the United States Patent and Trademark Office*

UNITED STATES PATENT AND TRADEMARK OFFICE
CERTIFICATE OF CORRECTION

PATENT NO. : 6,893,776 B2
APPLICATION NO. : 09/986431
DATED : May 17, 2005
INVENTOR(S) : Yoshinori Naruoka, Junichi Toriyama and Masanao Terasaki It is certified that error appears in the above-identified patent and that said Letters Patent is hereby corrected as shown below:

Please amend the second full paragraph in column 4 as follows:

The present invention also relates to a positive active material for the non-aqueous electrolyte secondary battery comprising a lithium-nickel composite oxide represented by the compositional formula $Li_aNi_{1-b-c-d}Co_bMn_cM_dO_2$ (in which M is at least one metal element selected from the group consisting of Al, Ti, W, Nb and Mo, the suffix a is not greater than 1.09 (a$\leq$1.09), the suffix b is from not smaller than 0.05 to not greater than 0.35 (0.05$\leq$b$\leq$0.35), the suffix c is from not smaller than 0.15 to not greater than 0.35 (0.15$\leq$c$\leq$0.35), and the suffix d is from greater than 0 to not greater than 0.35 ~~(0$\leq$d$\leq$0.35)~~ (0<d$\leq$0.35), with the proviso that the sum of b, c and d is from not smaller than 0.25 to not greater than 0.55 (0.25$\leq$b+c+d$\leq$0.55)0.55)) having a hexagonal structure. When subjected to the X-ray diffractometry with the CuK.alpha. ray, the lithium-nickel composite oxide exhibits an intensity ratio R (=($I_{012}$ +$I_{006}$)/$I_{101}$) of not greater <u>than</u> 0.50, R being the ratio of the sum of the diffraction peak intensity $I_{012}$ on the 012 plane and the diffraction peak intensity $I_{006}$ on the 006 plane to the diffraction peak intensity $I_{101}$ on the 101 plane.

Please amend the third full paragraph of column 4 as follows:

By this constitution, the crystallinity of the positive active material represented by the compositional formula $Li_aNi_{1-b-c-d}Co_bMn_cM_dO_2$~~an~~ can be kept high. At the same time, the adhesivity of the positive active material to the electrically conductive material and the binder in the positive electrode compound can be kept to inhibit the increase of internal resistance, making it possible to secure the excellent capacity density and cycle life performance.

Please amend the last paragraph of column 6 bridging column 7 as follows:

The organic solvent for the liquid electrolyte to be used in the non-aqueous electrolyte secondary battery of the invention is not specifically limited. Examples of the organic solvents Signed and Sealed this
Fifteenth Day of February, 2011

David J. Kappos
*Director of the United States Patent and Trademark Office* employable herein include ethers, ketones, lactones, ~~nitrites~~ <u>nitriles</u>, amines, amides, sulfur compounds, halogenated hydrocarbons, esters, carbonates, nitro compounds, phosphate compounds, and sulfolan-based hydrocarbons. Preferred among these organic solvents are ethers, ketones, esters, lactones, halogenated hydrocarbons, carbonates, and sulfolan-based compounds. Specific examples of these organic solvents include tetrahydrofuran, 2-methyltetrahydrofuran, 1,4-dioxane, anisole, monoglyme, 4-methyl-2-pentanone, ethyl acetate, methyl acetate, methyl propionate, ethyl propionate, 1,2-dichloroethane, .gamma.-butyrolactone, dimethoxyethane, methyl formate, dimethyl carbonate, methyl ethyl carbonate, diethyl carbonate, propylene carbonate, ethylene carbonate, vinylene carbonate, dimethylformamide, dimethyl sulfoxide, dimethylthioformamide, sulfolan, 3-methyl-sulfolan, trimethyl phosphate, triethyl phosphate, and mixture thereof. However, the present invention is not limited to these compounds. Preferred among these compounds are cyclic carbonates and cyclic esters. Even more desirable among these compounds are ethylene carbonate, propylene carbonate, methyl ethyl carbonate, and diethyl carbonate. These compounds may be used singly or in combination of two or more thereof.

Please amend the first full paragraph of column 7 as follows:

The electrolyte salt to be used in the non-aqueous electrolyte secondary battery of the invention is not specifically limited. In practice, however, $LiClO_4$, $LiBF_4$, $LiAsF_6$, $CF_3SO_3Li$, $LiPF_6$, $LiPF_3 (C_2F_5)_3$, $LiN(CF_3SO_2)_2$, ~~$LiN(C_2F_5SO_2)2$~~ <u>$LiN(C_2F_5SO_2)_2$</u>, LiI, ~~$LiAlCl4$~~ <u>$LiAlCl_4$</u>, and mixture thereof may be used. Preferably, lithium salt such as $LiBF_4$ and $LiPF_6$ may be used singly or in admixture.

Please amend the second full paragraph of column 7 as follows:

As the electrolyte ~~for, the~~ <u>for the</u> present invention, a solid ionically-conductive polymer electrolyte may be used auxiliary. In this case, the structure of the non-aqueous electrolyte secondary battery may be a combination of a positive electrode, a negative electrode, a separator, an organic or inorganic solid electrolyte membrane as a separator, and the foregoing non-aqueous liquid electrolyte, or a combination of a positive electrode, a negative electrode, an organic or inorganic solid electrolyte membrane as a separator, and the aforementioned non-aqueous liquid electrolyte. A polymer electrolyte membrane made of polyethylene oxide, polyacrylonitrile, polyethylene glycol or modification product thereof has a light weight and flexibility and thus can be used as an electrode to be wound to advantage. Besides the polymer electrolyte, an inorganic solid electrolyte or a mixture of an organic polymer electrolyte and an inorganic solid electrolyte may be used.

Please amend the last paragraph in column 7 bridging column 8 as follows:

As the starting materials for the positive active material, a mixed carbonates represented by the compositional formula ~~$Li_aNi_{1-b-c}Co_bMn_cCo_2$~~ <u>$Ni_{1-b-c}Co_bMn_cCO_3$</u> (in which b and c vary from greater than 0 to smaller than 1 ($0<b<1$; $0<c<1$)) and lithium hydroxide were mixed. The mixture was calcined at the temperature set forth in Table 1 in an oxygen atmosphere for 24 hours, and then ground to obtain a lithium-nickel composite oxide represented by the compositional formula $Li_aNi_{1-b-c}Co_bMn_cO_2$ set forth in Table 1. As a result of analysis by the X-ray diffraction, it was confirmed that many of these composite oxides have a hexagonal structure. The composition of these composite oxides were then quantitatively analyzed by the ICP emission spectroscopy. The results are set forth in terms of compositional formula of composite oxide in Table 1.

Please amend the second full paragraph in column 8 as follows:

~~All the positive active materials thus prepared exhibited a mean particle diameter of $D_{50}$ of 11.0 μm and a BET surface area of 0.60 m²/g. For the determination of the mean particle diameter $D_{50}$, the distribution of volume of particles was measured by the laser diffraction scattering method. The mean particle diameter corresponding to the volume of 50% was then determined. The BET surface area was measured by the $N_2$ gas absorption method. (Preparation of positive electrode and test battery) To a positive electrode compound obtained by mixing 87% of the aforementioned positive active material, 5% by weight of acetylene black and 8% by weight of a polyvinylidene fluoride was added N-methyl-2-pyrrolidone to prepare a viscous material. A foamed aluminum having a porosity of 90% was filled with this viscous material, dried in vacuo at a temperature of 150°C. to cause N-methyl-2-pyrrolidone to evaporate thoroughly, and then pressure molded.~~

All the positive active materials thus prepared exhibited a mean particle diameter $D_{50}$ of 11.0 μm and a BET surface area of 0.60 m²/g. For the determination of the mean particle diameter $D_{50}$, the distribution of volume of particles was measured by the laser diffraction scattering method. The mean particle diameter $D_{50}$ corresponding to the volume of 50% was then determined. The BET surface area was measured by the $N_2$ gas absorption method.
(Preparation of positive electrode and test battery)
To a positive electrode compound obtained by mixing 87% of the aforementioned positive active material, 5% by weight of acetylene black and 8% by weight of a polyvinylidene fluoride was added N-methyl-2-pyrrolidone to prepare a viscous material. A foamed aluminum having a porosity of 90% was filled with this viscous material, dried in vacuo at a temperature of 150°C. to cause N-methyl-2-pyrrolidone to evaporate thoroughly, and then pressure-molded.

Please amend the last full paragraph in column 8 as follows:

The test battery was charged to 4.3 V (with respect to lithium metal) at a ~~current: of~~ current of 1.0 mA/cm², and then discharged to 3.0 V at a current of 1.0 mA/cm². The discharge capacity at this point was then measured. Under these conditions, charge and discharge were then repeated. After 50 cycles of charge and discharge, the test battery was then measured for discharge capacity. The capacity retention was then calculated by dividing the discharge capacity by the initial discharge capacity.

In column 10, Table 2, please change the heading "$Li_aNi_{1-b-c}CO_bMn_cO_2$" to -- $Li_aNi_{1-b-c}Co_bMn_cO_2$ --

In column 11, Table 3, please change the heading "$Li_aNi_{1-b-c}CO_bMn_cO_2$" to -- $Li_aNi_{1-b-c}Co_bMn_cO_2$ --

CERTIFICATE OF CORRECTION (continued)

U.S. Pat. No. 6,893,776 B2

Please amend the first full paragraph in column 13 as follows:

Subsequently, $Li_{1.08}Ni_{0.53}Co_{0.14}Mn_{0.30}Al_{0.03}O_2$ was prepared as Example 26. The starting material of the positive active material was prepared by mixing ~~$Ni_{0.55}Co_{0.15}Mn_{0.30}Co_3$~~ $\underline{Ni_{0.55}Co_{0.15}Mn_{0.30}CO_3}$ with aluminum hydroxide $Al(OH)_3$ and lithium hydroxide LiOH in an amount of 0.03 mols and 1.1 mols, respectively, per mol of ~~$Ni_{0.55}Co_{0.15}Mn_{0.30}Co_3$~~ $\underline{Ni_{0.55}Co_{0.15}Mn_{0.30}CO_3}$, and then calcining the mixture at a temperature of 900° C. in an oxygen atmosphere for 24 hours. The positive active material was then used to prepare a positive electrode and a battery in the same manner as in Example 1. The battery thus prepared was then measured for the diffraction peak intensity ratio, capacity density, discharge capacity retention, exotherm starting temperature and exotherm. As a result, the diffraction peak intensity ratio R was 0.458, the capacity density was 158 mAh/g, the discharge capacity retention was 91%, the exotherm starting temperature was 253.0° C., and the exotherm was 357 J/g.